United States Patent
Pica et al.

(10) Patent No.: US 9,864,097 B2
(45) Date of Patent: Jan. 9, 2018

(54) SYSTEM AND METHOD FOR MODELLING THREE DIMENSIONAL SHALLOW WATER MULTIPLES USING PREDICTIVE SEA FLOOR RECONSTRUCTION

(71) Applicant: CGG SERVICES SA, Massy (FR)

(72) Inventors: Antonio Pica, Vanves (FR); Sylvain Le Roy, Palaiseau (FR)

(73) Assignee: CGG SERVICES SAS, Massy (FR)

( * ) Notice: Subject to any disclaimer, the term of this patent is extended or adjusted under 35 U.S.C. 154(b) by 807 days.

(21) Appl. No.: 14/219,167

(22) Filed: Mar. 19, 2014

(65) Prior Publication Data
US 2014/0288891 A1    Sep. 25, 2014

Related U.S. Application Data

(60) Provisional application No. 61/803,624, filed on Mar. 20, 2013.

(51) Int. Cl.
| | |
|---|---|
| G06F 17/50 | (2006.01) |
| G01V 99/00 | (2009.01) |
| G01V 1/36 | (2006.01) |
| G01V 1/30 | (2006.01) |
| G01V 1/38 | (2006.01) |

(52) U.S. Cl.
CPC .............. *G01V 99/005* (2013.01); *G01V 1/30* (2013.01); *G01V 1/364* (2013.01); *G01V 1/38* (2013.01); *G01V 2210/56* (2013.01)

(58) Field of Classification Search
CPC .. G01V 99/005; G01V 1/364; G01V 2210/56; G01V 1/30; G01V 1/38
See application file for complete search history.

(56) References Cited

U.S. PATENT DOCUMENTS

| | | | | |
|---|---|---|---|---|
| 4,234,938 A | * | 11/1980 | Allen ................... | G01V 1/3808 181/111 |
| 5,051,960 A | * | 9/1991 | Levin .................... | G01V 1/364 367/24 |
| 5,524,100 A | * | 6/1996 | Paffenholz .......... | G01V 1/3808 367/21 |
| 6,735,527 B1 | | 5/2004 | Levin | |

(Continued)

FOREIGN PATENT DOCUMENTS

WO    2012/074612 A1    6/2012

OTHER PUBLICATIONS

C. Samson et al., "Dereverberation of marine reflection seismic data by a spatial combination of predictive deconvolution and velocity filtering," 1995, Marine Geophysical Researches, vol. 17, pp. 1-15.*

(Continued)

*Primary Examiner* — Kamini S Shah
*Assistant Examiner* — Russ Guill
(74) *Attorney, Agent, or Firm* — Patent Portfolio Builders PLLC

(57) ABSTRACT

A method for modeling shallow water multiples modeling using a predicted sea floor reconstruction is provided. A seafloor reflectivity image is reconstructed using acquired seismic data. Surface multiples are determined by evaluating a seismic wave equation using, as an input, the reconstructed seafloor reflectivity image. The determined surface multiples are subtracted from the acquired seismic data.

13 Claims, 5 Drawing Sheets

(56) References Cited

U.S. PATENT DOCUMENTS

| | | | |
|---|---|---|---|
| 6,832,161 B1 | 12/2004 | Moore | |
| 2006/0050611 A1* | 3/2006 | Borresen | G01V 1/364 367/24 |
| 2009/0222211 A1* | 9/2009 | Burnstad | G01V 1/3808 702/17 |
| 2011/0251828 A1* | 10/2011 | Scoullar | G01V 1/28 702/189 |
| 2012/0253758 A1* | 10/2012 | Lazaratos | G01V 1/282 703/2 |

OTHER PUBLICATIONS

Wendell Wiggins, "Multiple attenuation by explicit wave extrapolation to an interpreted horizon," 1999, The Leading Edge, vol. 18, issue 1, pp. 46-54.*

Nurul Kabir et al., "3D wavefield extrapolation based demultiple in ormen lange," 2004, SEG International Exposition and 74th Annual Meeting, four pages.*

Kunlun Yang et al., "Shallow water demultiple with seafloor reflection modeling using multichannel prediction," Nov. 4, 2012, 2012 Society of Exploration Geophysicists, five pages.*

Extended European Search Report in corresponding European Application No. 14160736.6 dated Nov. 17, 2015.

B. Artman, et al.; "Image-space surface-related multiple prediction"; Geophysics, Mar.-Apr. 2007; pp. S113-S122; vol. 72, No. 2.

B. Dragosel, et al.; "A perspective on 3D surface-related multiple elimination"; Geophysics, Sep.-Oct. 2010; pp. 75A245-75A261; vol. 75, No. 5.

B. Hung, et al.; "Workflow for Surface Multiple Attenuation in Shallow Water"; IPTC (International Petroleum Technology Conference); IPTC 14770; Nov. 1, 2011; pp. 15-17; XP055226965.

S.H. Gray et al., "Seismic Migration Problems and Solutions", Geophysics, Sep.-Oct. 2001, pp. 1622-1640, vol. 66, No. 5.

A. Pica et al., "3D SRME on OBS Data Using Waveform Multiple Modelling", SEG 2006 Annual Meeting, New Orleans, Oct. 1-6, 2006, pp. 2659-2663.

A. Pica et al, "3D Surface-Related Multiple Modeling", The Leading Edge, Mar. 2005, pp. 292-296.

A. Pica et al, "3D Surface-Related Multiple Modeling, Principles and Results", SEG 2005 Annual Meeting, Houston, Nov. 6-11, 2005, pp. 2080-2084.

T. Weisser et al., "Wave Equation Based Multiple Modelling—Comparison of Nominal and Dense Acquisition Geometries", EAGE 68th Conference & Exhibition, Vienna, Austria, Jun. 12-15, 2006, F022.

T. Weisser et al., "Wave Equation Multiple Modelling: Acquisition Independent 3D SRME", First Break, Sep. 2006, pp. 75-79, vol. 24.

Examination Report in corresponding Australian Application No. 2014201497 dated Sep. 11, 2017.

* cited by examiner

SYSTEM AND METHOD FOR MODELLING THREE DIMENSIONAL SHALLOW WATER MULTIPLES USING PREDICTIVE SEA FLOOR RECONSTRUCTION

PRIORITY INFORMATION

The present application claims priority under 35 U.S.C. §119(e) to U.S. Provisional Patent Application Ser. No. 61/803,624, filed Mar. 20, 2013, the entire contents of which are expressly incorporated herein by reference.

TECHNICAL FIELD

The embodiments relate generally to marine seismic exploration systems, and more specifically to systems and methods for determining shallow water multiples in the processing of seismic data.

BACKGROUND

Seismic waves generated artificially have been used for more than 50 years for the imaging of geological layers. In a marine setting, the most widely used waves are reflected waves and, more precisely, reflected compressional waves, recorded by hydrophones and/or accelerometers. In other settings (e.g. land and ocean bottom surveys), shear wave energy can also be of interest. During seismic prospection operations, vibrator equipment (also known as a "source") generates a seismic signal that propagates in the form of a wave that is reflected from interfaces of geological layers. These waves are received by geophones, hydrophones and/or other types of receivers, which convert the displacement of the ground resulting from the propagation of the waves into an electrical signal recorded by recording equipment. Analysis of the arrival times and amplitudes of these waves makes it possible to construct a representation of the geological layers on which the waves are reflected.

A widely used technique for searching for oil or gas, therefore, is the seismic exploration of subsurface geophysical structures. Reflection seismology is a method of geophysical exploration to determine the properties of a portion of a subsurface layer in the earth, which information is especially helpful in the oil and gas industry. Marine-based seismic data acquisition and processing techniques are used to generate a profile (image) of a geophysical structure (subsurface) of the strata underlying the seafloor. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

For a marine seismic gathering or acquisition process, as shown in FIG. 1, a data acquisition system 100 includes a ship 102 towing plural streamers 106 that may extend over kilometers behind ship 102. Each of the streamers 106 can include one or more birds 130 that maintains streamer 106 in a known fixed position relative to other streamers 106, and the birds 130 are capable of moving streamer 106 as desired according to bi-directional communications birds 130 can receive from ship 102. One or more source arrays 104a,b may be also towed by ship 102 or another ship (not shown) for generating seismic waves. Source arrays 104a,b can be placed either in front of or behind receivers 140, or both behind and in front of receivers 140. The seismic waves generated by source arrays 104a,b propagate downward, reflect off of, and penetrate the seafloor, wherein the refracted waves eventually are reflected by one or more reflecting structures (not shown in FIG. 1) back to the surface. The reflected seismic waves propagate upwardly and are detected by receivers 140 provided on streamers 106. This process is generally referred to as "shooting" a particular seafloor area, and the seafloor area can be referred to as a "cell," or geographical area of interest (GAI).

The signals recorded by seismic receivers 140 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface. Waves other than primary waves are known as multiples, and more strictly, are events that have undergone more than one reflection. Typically, internal multiples, which occur when energy is reflected downward at an interface layer in the subsurface, have a much smaller amplitude than primary reflected waves, because for each reflection, the amplitude decreases proportionally to the product of the reflection coefficients of the different reflectors (usually layers or some sort). Another type of multiple is the so-called "surface multiple" which occurs when a seismic acoustic wave is reflected downwardly from the surface of the water during marine seismic surveying.

Thus, for the foregoing reasons, the acquisition of data in marine-based seismic methods usually produces different results in source strength and signature based on differences in near-surface conditions. Further data processing and interpretation of seismic data therefore typically involves correction of these differences in the early stages of processing. For example, with respect to multiples, Surface-Related Multiples Elimination (SRME) is a technique commonly used to predict a multiples model from received seismic data. Attenuating the surface-related multiples using SRME is based on predicting a multiples model, adapting the multiples model and subtracting the adapted multiples model from the received seismic data.

There are certain problems, however, with accurately modeling shallow water seafloor reflectors as part of the overall seismic data processing, such that it is very difficult to reduce or eliminate the influence of the multiples generated by shallow water seafloor reflectors. In this context, "shallow" can refer to a depth which is less than approximately the distance between a source and the closest receiver to that source, i.e., the smallest offset in the seismic acquisition system. One of the reasons these problems occur is because of move-out issues. As will be appreciated by those skilled in the art, move-out refers to the effect that the distance between a seismic source and a receiver (the offset) has on the arrival time of a reflection in the form of an increase of time as a non-linear function of offset. While in some cases upper reflectors, e.g., reflections from the surface of the water, can be determined and eliminated from the acquired seismic data, attempts to correlate the upper reflectors to shallow water seafloor reflectors using 2D convolution operations sometimes fail because the geometry of acquisition only allows prediction for some given offset length, for example with far offsets of between 200 and 400 meters, but not with shorter offsets, which is typically the case with shallow seafloor conditions that reduce the travel distance for acoustic waves between seismic sources and receivers.

Accordingly, it would be desirable to provide methods and systems for predicting shallow water multiple models in order to improve the image of the geographical area of interest.

SUMMARY

An aspect of the embodiments is to substantially solve at least one or more of the problems and/or disadvantages discussed above, and to provide at least one or more of the advantages described below. It is therefore a general aspect of the embodiments to provide a system and method for shallow water multiples modelling according to an embodiment that will obviate or minimize problems of the type previously described. This can be accomplished by, for example, using a technique for predicted sea floor reconstruction.

According to an embodiment, a method for modeling shallow water multiples includes the steps of reconstructing a seafloor reflectivity image using seismic data; evaluating a seismic wave equation using, as an input, the reconstructed seafloor reflectivity image to determine surface multiples, and subtracting the determined surface multiples from the seismic data.

According to another embodiment, a method for modeling three dimensional (3D) shallow water multiples modeling using a predicted sea floor reconstruction, includes the steps of estimating a plurality of 1D prediction deconvolution operators with a group of short offset traces, migrating each of the plurality of estimated 1D prediction deconvolution operators to create a set of migrated 1D prediction deconvolution operators, accumulating the set of migrated 1D prediction deconvolution operators to create a set of 3D prediction deconvolution operators, reconstructing the 3D seafloor set of reflectivities within the GAI using the set of 3D prediction deconvolution operators, evaluating a seismic wave equation using as an input the reconstructed 3D seafloor set of reflectivities to determine surface multiples, and performing adaptive subtraction of the determined surface multiples in regard to acquired seismic data to obtain substantially surface multiples free seismic data for a geographical area of interest (GAI).

According to another embodiment, a seismic data processing system for modeling shallow water multiples includes at least one processor configured to reconstruct a seafloor reflectivity image using seismic data, evaluate a seismic wave equation using, as an input, the reconstructed seafloor reflectivity image to determine surface multiples, and to subtract the determined surface multiples from the seismic data.

BRIEF DESCRIPTION OF THE DRAWINGS

The above and other aspects of the embodiments will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
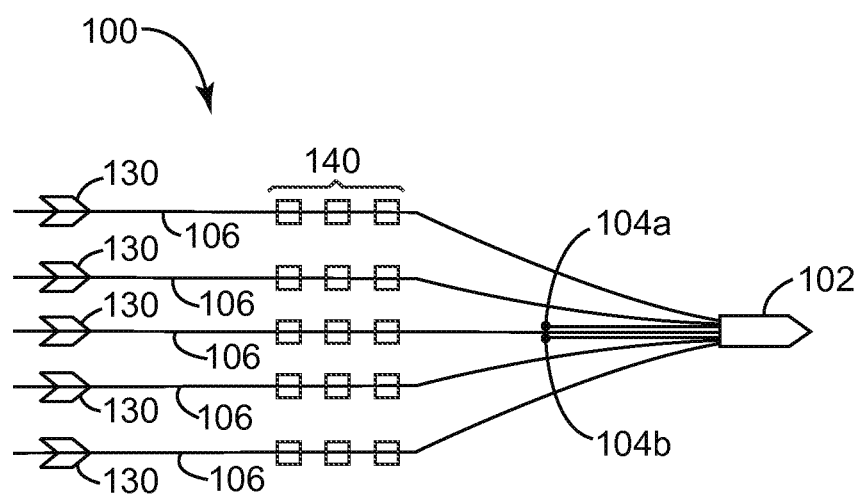
FIG. 1 illustrates a top view of a marine seismic exploration system for use in a marine seismic gathering process.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. It will be apparent to one skilled in the art, however, that at least some embodiments may be practiced without one or more of specific details described herein. In other instances, well-known components or methods are not described in details or are presented in simple block diagram format in order to avoid unnecessarily obscuring the embodiments. The scope of the embodiments is therefore defined by the appended claims. The following embodiments are discussed, for simplicity, with regard to the terminology and structure of a shallow water marine seismic exploration system. However, the embodiments to be discussed next are not limited to these systems but may be applied to other marine seismic exploration systems that are affected by inaccurate three dimensional multiple modeling in water environments.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

As mentioned above, existing techniques for removing multiples from seismic data sets struggle with multiples caused by acoustic waves reflected by reflectors in shallow waters. These embodiments address this issue by using techniques to reconstruct the sea floor in which the shallow reflectors are located, and then using that information to assist in modelling the multiples prior to their removal from the seismic data set. The methods and systems described herein according to various embodiments provide for construction of a 3D migrated shallow reflectivity section even when primary reflections cannot be used directly. By using the reconstructed reflectivity section with wave equation based multiple modeling, they enable building the series of surface multiples, for every reflection involved, into a multiple reflection with the shallow reflectors thus reconstructed.

Figure 2:
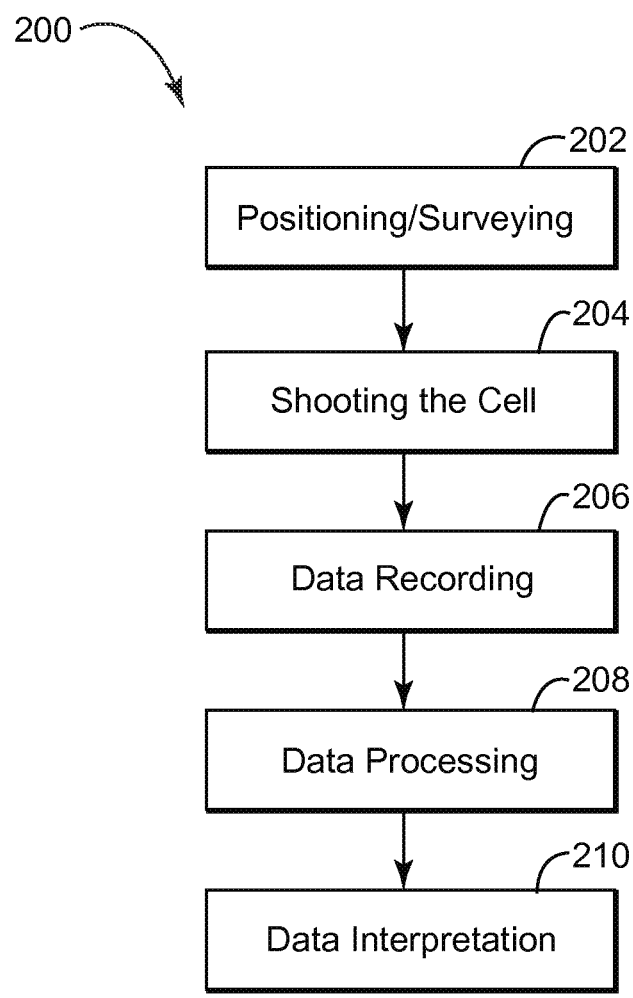
FIG. 2 shows a general method for seismic exploration.

Prior to discussing these embodiments in detail, it may be useful to understand the process of seismic acquisition in general, so as to understand where the embodiments may be utilized within the overall process. As generally discussed above, the main purpose of seismic exploration is to render the most accurate possible graphic representation of specific portions of the Earth's subsurface geologic structure (also referred to as a GAI). The images produced allow exploration companies to accurately and cost-effectively evaluate a promising target (prospect) for its oil and gas yielding potential. FIG. 2 illustrates a general method for seismic exploration (method 200). There are five main steps: a detailed discussion of any one of the process steps would far exceed the scope of this document, but a general overview of the process should aid in understanding where the different aspects of the embodiments can be used. Step 202 of method 200 involves positioning and surveying of the potential site for seismic exploration, i.e., to ensure that the correct area is being imaged and to establish pre-plot navigation lines as part of this exercise.

In step 204, seismic signals are transmitted to perform the shooting of the cell described above in the Background section. In step 206, data recording occurs. In a first part of this step, receivers 140 receive and most often digitize the data, and in a second part of the step 206, the data is transferred to a recording station. In step 208, data processing occurs. Data processing generally involves enormous amounts of computer processing resources, including the storage of vast amounts of data, multiple processors or computers running in parallel. Among other things, the data processing 208 involves removal of multiples, e.g., using the embodiments described below. Finally, in step 210, data interpretation occurs and results can be displayed, sometimes in two-dimensional form, more often now in three dimensional form. Four dimensional data presentations (a 3D plot or graph, over time (the fourth dimension) are also possible, when needed to track the effects of other processes, for example.

Having provided this overview, systems and methods developed according to the embodiments disclosed herein, are designed for reconstructing the seafloor by building 3D reflectivity sections when the reflectivity model cannot be built from primary reflections in shallow water environments. Typically, these situations occur when the water layer depth is smaller than the offset of the closest traces to the source position (i.e., the distance from source 104 to the closest receiver 140). In that case, either the stretch resulting from the move out of the shallowest reflections will not allow for a proper reconstruction of the shallower reflectors, and/or those shallower reflections are masked by refracted arrivals.

Method 300 for shallow water multiples modelling using a predicted sea floor reconstruction begins with step 302, wherein marine-based seismic waves are generated by sources 104. In step 304, primary reflected waves, and multiples are acquired by receivers 140, processed and stored in system 100 (the processing aspects of which are described in greater detail below). In step 306, method 300 creates a plurality of windows in regard to the acquired and stored data, and in step 308, further sub-divides the data in each window into a plurality of bins per window.

In step 310, method 300 computes or estimates 1D predictive deconvolution operators on a bin-by-bin basis to permit determination (in a later step) of an initial sea-floor reflectivity image. It is referred to here as an initial sea-floor reflectivity image because additional processing is performed to correct for migration. In step 310, the 1D prediction deconvolution operators are estimated for each bin in each window using a group of short offset traces. In this context, the length of the short offset traces will depend on the acquisition spread of the marine seismic system and can range from, for example, about 200 meters to about 1000 meters. According to a further embodiment, as discussed above, the short offset traces can be other values related to the acquisition spread, and as such, as those of skill in the art can appreciate, such short offset traces values provided herein are merely for purposes of illustration and example, only, and should not be taken as limiting the embodiments described herein in any manner whatsoever.

Thus, according to this embodiment, the 1D prediction deconvolution operators are estimated for each bin using a group of short offset traces within each estimation window, and the resultant sea-floor reflectivity image (when determined; described below in a further step) provides one or more deep primary reflections (per bin) rather than shallow primary reflections. If method 300 used the acquired 1D prediction deconvolution operators as described above to determine a reconstruction of the reflectivities of the seafloor, and neighboring areas, it would be a zero offset reconstruction, which would be incorrect, and provide incorrect image information. Therefore, in the next step, step 312, according to an embodiment, each of the 1D prediction deconvolution operators are migrated using zero offset migration algorithms (using one of time or depth), for correctly positioning the reflectivities which were previously determined. According to an embodiment, and as those of skill in the art can appreciate, examples of the zero offset migration algorithms include those described in the article "Seismic Migration Problems and Solutions," Gray, S., et al., Geophysics Vol. 66, No. 5, September-October, p 1622-1640.

In step 314, method 300 determines a 3D prediction deconvolution operator for the entire GAI. More specifically, method 300 determines the 3D prediction deconvolution operator for the GAI by accumulating the set of migrated 1D prediction deconvolution operators to create the 3D prediction deconvolution operator for the entire GAI, composed of individual 1D prediction deconvolution operators. According to a further embodiment, the process of computing 1D prediction deconvolution operators provides one 1D prediction operator per bin, which can then be used for the construction of a full set of 3D block prediction deconvolution operators. In step 316, the reflectivities of the seafloor are reconstructed, including some neighboring areas by using the accumulated and migrated 1D prediction deconvolution operators.

According to an alternate embodiment, the reconstructed seafloor reflectivities can be determined in a manner different than that as discussed in regard to steps 310-316 (as in those steps, the alternate process discussed below would be done on a bin-by-bin, window-by-window basis). More specifically, the alternate embodiment comprises building a reflectivity section (i.e., a bin of a window) directly in a migrated condition, by migrating the data itself, rather than the 1D prediction deconvolution operators.

In this regard, it is known to those of skill in the art that waves propagate from seismic sources, interact with discontinuities and return to the surface as reflected seismic waves. A "source" wavefield is commonly discussed as originating at the seismic source 104 and propagating in the medium prior to any interaction with discontinuities, and a "receiver" wavefield, originating at discontinuities and propagating in the medium to the receivers 140. The two wavefields kinematically coincide at discontinuities. The "imaging condition," therefore, is that which occurs at the discontinuity. According to the alternate embodiment, steps 310-312 can be replaced by Equation (1), shown below, wherein R represents the migrated image, U represents the reflected or "Up-going" waves, and D represents the transmitted wave or "Down-going" waves. In this case, therefore, the alternate embodiment provides that the reflectivities of each of the bins can be found directly by computing a convolution, in the Fourier domain, of the up-going waves (U-waves) and the down-going waves (D-waves), which is simply a division, as shown in Equation (1):

$$R = \frac{U}{D}; \quad (1)$$

where R is the resultant reflectivity section of the respective bin, U is the up-going wave in the respective bin, and D is the down-going wave in the respective bin. According to a further embodiment, Equation (1) can be re-written as—

$$R = \frac{UD^*}{DD^*}, \quad (1')$$

wherein UD* is the correlation between U and D, and DD* is the correlation between D and D, and in a perfect mathematical sense equals 1, but in a real-world, practical sense, does not. Migration algorithms work best in the temporal frequency domain, and can also be evaluated or performed in the time domain, but are much more tedious to implement, as those of skill in the art can appreciate.

Method 300 then proceeds, in step 318, to model surface multiples that correspond to the shallow reflectors, as developed in method step 316. The 3D migrated prediction operators rendering the reconstruction of shallow reflectors can be used to model corresponding surface multiples by using wave equation based multiples modeling. Wave equation based multiples modeling is known to those of skill in the art, and is more completely described in several documents, including the following: Pica, A., et al., "3D Surface-Related Multiple Modeling," The Leading Edge, March 2005, Vol. 24, No. 3, pp. 292-296; Pica, A., et al., "3D Surface-Related Multiple Modeling, Principles and Results," SEG Technical Program, Expanded Abstracts, 2005, pp. 2080-2083; Weisser, T., et al., "Wave Equation Based Multiple Modelling—Comparison of Nominal and Dense Acquisition Geometries," EAGE, Extended Abstracts, 2006, pp. F022; Weisser, T., et al., "Wave Equation Multiple Modelling: Acquisition Independent 3D SRME," First Break, 2006, Vol. 24, No. 9, pp. 75-80; and Pica, A., et al., "3D SRME on OBS Data Using Waveform Multiple Modelling," SEG Technical Program Expanded Abstracts, 2006, pp. 2659-2663, each of which is incorporated herein by reference. A synopsis of the process described in these incorporated-by-reference documents includes building receiver side peg-legs with the regular data, and then building the source side peg-leg by employing properties of symmetry of data through source and receiver reciprocity.

In step 320, method 300 corrects acquired surface data by performing adaptive subtraction of surface multiples in regard to the acquired surface seismic data. The result is a substantially surface multiples free set of seismic data for the GAI, and more specifically a seismic data set that is substantially free of multiples caused by shallow water reflectors, that can then be subjected to further data and signal processing, and or conditioned/prepared for display.

The method and system described herein according to various embodiments provides construction of a 3D migrated shallow reflectivity section even when primary reflections cannot be used directly. By using the reconstructed reflectivity section with wave equation based multiple modeling, it allows for building the series of surface multiples (peg-legs) for every reflection involved into a multiple reflection with the shallow reflectors thus reconstructed.

According to a further embodiment, reflectivity obtained with prediction operators is full bandwidth, and thus the multiples model obtained by wave equation based multiple modeling are also in the same bandwidth of the input data, thereby making the task easier for the adaptive subtraction of the multiples (see, discussion above regarding step 320). According to an embodiment, method 300 does not require any picking of the sea floor or of its neighboring reflectors. Method 300 also, according to a further embodiment, handles properly the 3D propagation effects, while 1D or 2D methods based on predictions or modeling by convolution do not.

According to a further embodiment, the system and method described herein can be used for modeling surface related multiples, especially when the reflectivity model cannot be built from primaries reflections in shallow water environment. It can also be used in the more general case where primaries from the data can be used.

Figure 4:
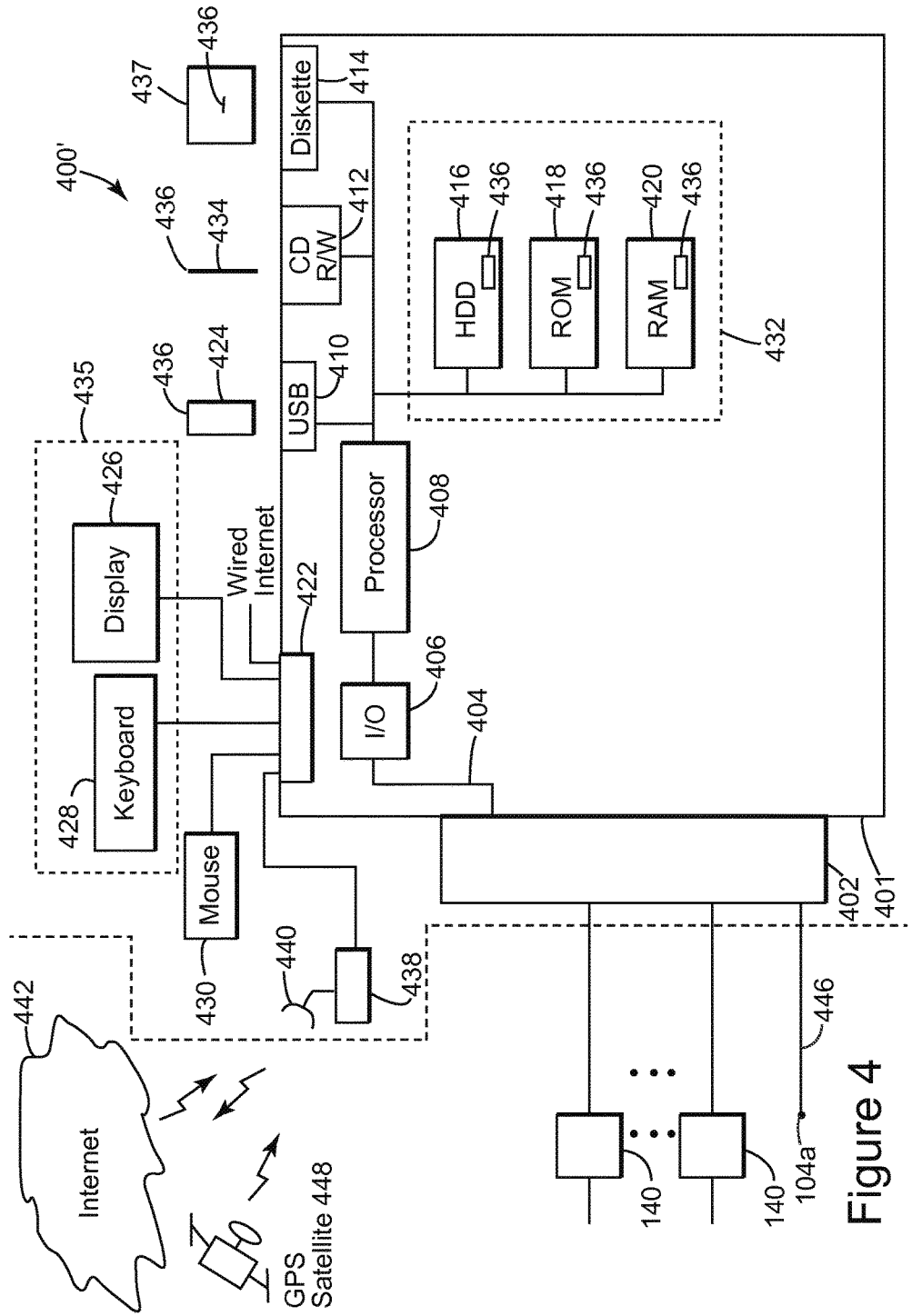
FIG. 4 illustrates a seismic data acquisition system suitable for use to implement a method for shallow water multiples modelling using a predicted sea floor reconstruction according to an embodiment.

FIG. 4 illustrates a seismic data acquisition system (system) 400 suitable for use to implement a method for three dimensional shallow water multiples modelling using a predicted sea floor reconstruction according to an embodiment. System 400 includes, among other items, server 401, source/receiver interface 402, internal data/communications bus (bus) 404, processor(s) 408 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 410, compact disk (CD)/digital video disk (DVD) read/write (R/W) drive 412, floppy diskette drive 414 (though less used currently, many servers still include this device), and data storage unit 432.

Data storage unit 432 itself can comprise hard disk drive (HDD) 416 (these can include conventional magnetic storage media, but, as is becoming increasingly more prevalent, can include flash drive-type mass storage devices 424, among other types), ROM device(s) 418 (these can include electrically erasable (EE) programmable ROM (EEPROM) devices, ultra-violet erasable PROM devices (UVPROMs), among other types), and random access memory (RAM) devices 420. Usable with USB port 410 is flash drive device 424, and usable with CD/DVD R/W device 412 are CD/DVD disks 434 (which can be both read and write-able). Usable with diskette drive device 414 are floppy diskettes 437. Each of the memory storage devices, or the memory storage media (416, 418, 420, 424, 434, and 437, among other types), can contain parts or components, or in its entirety, executable software programming code (software) 436 that can implement part or all of the portions of the method described herein. Further, processor 408 itself can contain one or different types of memory storage devices (most probably, but not in a limiting manner, RAM memory storage media 420) that can store all or some of the components of software 436.

In addition to the above described components, system 400 also comprises user console 435, which can include keyboard 428, display 426, and mouse 430. All of these components are known to those of ordinary skill in the art, and this description includes all known and future variants of these types of devices. Display 426 can be any type of known display or presentation screen, such as liquid crystal displays (LCDs), light emitting diode displays (LEDs), plasma displays, cathode ray tubes (CRTs), among others. User console 435 can include one or more user interface mechanisms such as a mouse, keyboard, microphone, touch pad, touch screen, voice-recognition system, among other inter-active inter-communicative devices.

User console 435, and its components if separately provided, interface with server 401 via server input/output (I/O) interface 422, which can be an RS232, Ethernet, USB or other type of communications port, or can include all or some of these, and further includes any other type of communications means, presently known or further developed. System 400 can further include communications satellite/global positioning system (GPS) transceiver device 438 (to receive signals from GPS satellites 448), to which is electrically connected at least one antenna 440 (according to an embodiment, there would be at least one GPS receive-only antenna, and at least one separate satellite bi-directional communications antenna). System 400 can access internet 442, either through a hard wired connection, via I/O interface 422 directly, or wirelessly via antenna 440, and transceiver 438.

Server 401 can be coupled to other computing devices, such as those that operate or control the equipment of ship 102, via one or more networks. Server 401 may be part of a larger network configuration as in a global area network (GAN) (e.g., internet 442), which ultimately allows connection to various landlines.

According to a further embodiment, system 400, being ostensibly designed for use in seismic exploration, will interface with one or more sources 104a,b and one or more receivers 140. These, as previously described, are attached to streamers 106, to which are also attached birds 130 that are useful to maintain positioning. As previously discussed, sources 104 and receivers 140 can communicate with server 401 either through an electrical cable that is part of each streamer 106, or via a wireless system that can communicate via antenna 440 and transceiver 438 (collectively described as communications conduit 446).

According to further embodiments, user console 435 provides a means for personnel to enter commands and configuration into system 400 (e.g., via a keyboard, buttons, switches, touch screen and/or joy stick). Display device 426 can be used to show: streamer 6 position; visual representations of acquired data; source 104 and receiver 140 status information; survey information; and other information important to the seismic data acquisition process. Source and receiver interface unit 402 can receive the hydrophone seismic data from receiver 140 though streamer communication conduit 446 (discussed above) that can be part of streamer 106, as well as streamer position information from birds 130; the link is bi-directional so that commands can also be sent to birds 130 to maintain proper streamer positioning. Source and receiver interface unit 402 can also communicate bi-directionally with sources 104 through the streamer communication conduit 446 that can be part of streamer 106. Excitation signals, control signals, output signals and status information related to source 104 can be exchanged by streamer communication conduit 446 between system 400 and source 104.

Bus 404 allows a data pathway for items such as: the transfer and storage of data that originate from either the source sensors or streamer receivers; for processor 408 to access stored data contained in data storage unit memory 432; for processor 408 to send information for visual display to display 426; or for the user to send commands to system operating programs/software 436 that might reside in either the processor 408 or the source and receiver interface unit 402.

System 400 can be used to implement method 300 for three dimensional shallow water multiples modelling using a predicted sea floor reconstruction according to an embodiment. Hardware, firmware, software or a combination thereof may be used to perform the various steps and operations described herein. According to an embodiment, software 436 for carrying out the above discussed steps can be stored and distributed on multi-media storage devices such as devices 416, 418, 420, 424, 434, and/or 437 (described above) or other form of media capable of portably storing information (e.g., universal serial bus (USB) flash drive 424). These storage media may be inserted into, and read by, devices such as the CD-ROM drive 412, disk drives 414, 416, among other types of software storage devices.

It should be noted in the embodiments described herein that these techniques can be applied in either an "offline", e.g., at a land-based data processing center or an "online" manner, i.e., in near real time while on-board the seismic vessel. For example, 3D shallow water multiples modelling using a predicted sea floor reconstruction can occur as the seismic data is data is recorded on-board the seismic acquisition vessel 102. In this case, it is possible for 3D shallow water multiples models data to be generated as a measure of the quality of the sampling run.

Figure 3:
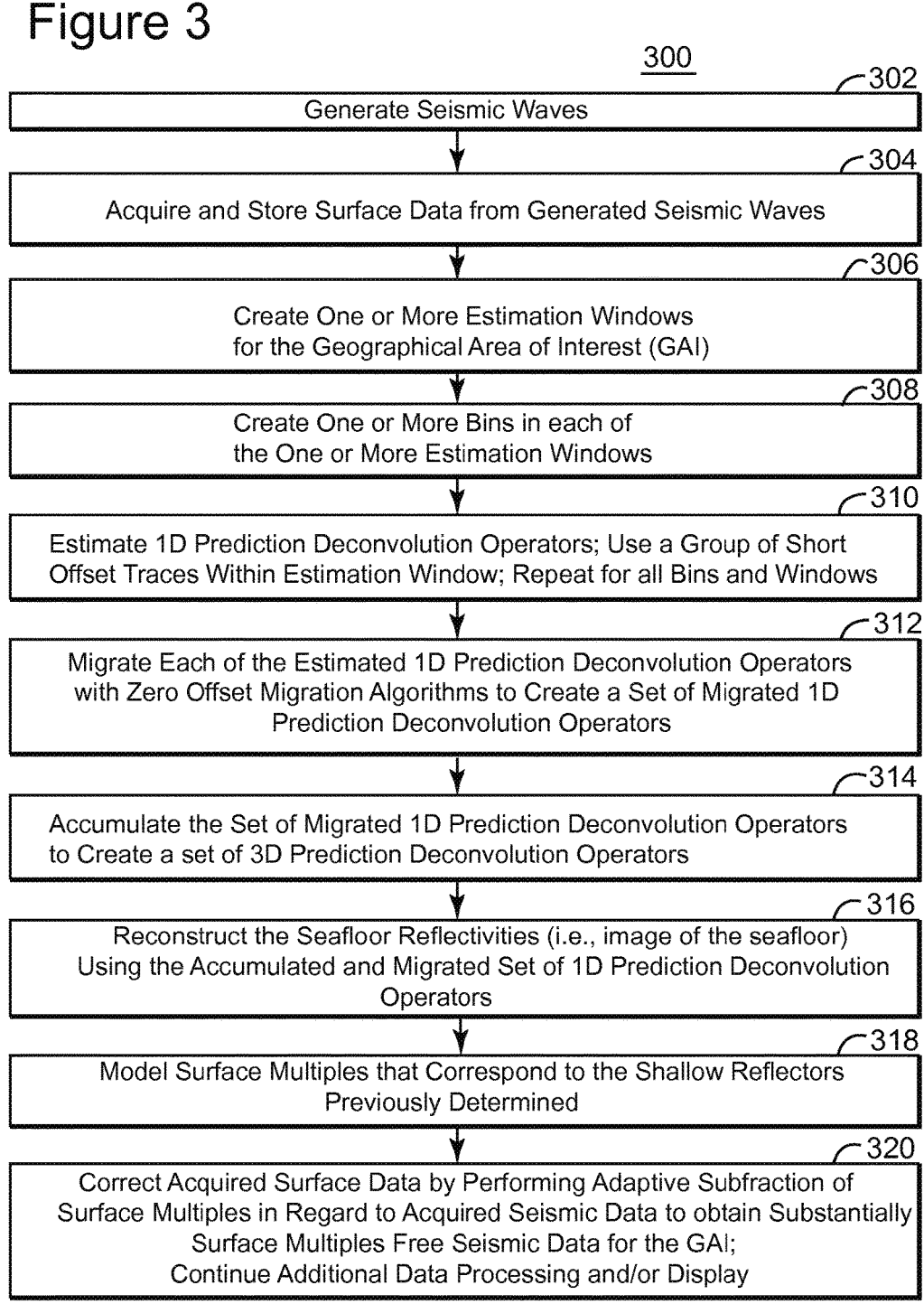
FIG. 3 illustrates a flow chart of method for shallow water multiples modelling using a predicted sea floor reconstruction according to an embodiment.
Figure 5:
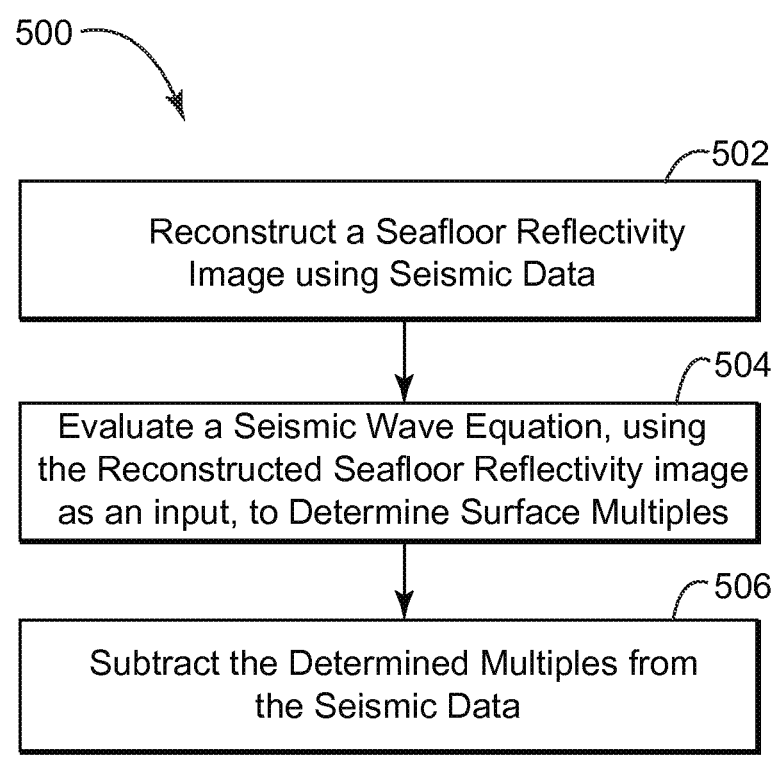
FIG. 5 is a flow chart illustrating another method for multiples modelling according to an embodiment.

Moreover, it will be appreciated by those skilled in the art that the embodiment described above with respect to FIG. 3 can be generalized by, for example, omitting step(s) and/or generalizing them. For example, as shown in FIG. 5, a method for modeling shallow water multiples can include the steps of reconstructing (502) a seafloor reflectivity image using seismic data, evaluating (504) a seismic wave equation using, as an input, the reconstructed seafloor reflectivity to determine surface multiples; and subtracting (506) the determined surface multiples from the seismic data, to obtain substantially surface multiples free seismic data for a geographical area of interest (GAI).

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or non-volatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/non-volatile computer storage media. For example, the processor can access a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and a method for 3D shallow water multiples modelling using a predicted sea floor reconstruction. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A method for oil and gas exploration in an underground formation covered by shallow water, the method comprising:

acquiring seismic data related to the underground formation by deploying data acquisition equipment, generating seismic waves and detecting reflected seismic waves;

reconstructing a 3D seafloor reflectivity image using the seismic data;

evaluating a seismic wave equation using, as an input, said reconstructed 3D seafloor reflectivity image to determine surface multiples;
subtracting said determined surface multiples from said seismic data to obtain surface multiples free seismic data; and
generating an image of the underground formation based on the surface multiples free seismic data, the image being usable to evaluate whether oil and gas is present,
wherein said step of reconstructing comprises:
estimating a plurality of 1D prediction deconvolution operators with a group of short offset traces;
migrating each of said plurality of estimated 1D prediction deconvolution operators to create a set of migrated 1D prediction deconvolution operators;
accumulating said set of migrated 1D prediction deconvolution operators to create a set of 3D prediction deconvolution operators; and
reconstructing said 3D seafloor reflectivity image within a geographical area of interest, GAI, using said set of 3D prediction deconvolution operators.

2. The method according to claim 1, wherein said group of short offset traces have a length within a range of 200-1000 meters.

3. The method according to claim 1, wherein said step of reconstructing comprises:
creating one or more estimation windows from said stored seismic data;
creating one or more bins for each said one or more estimation windows; and
repeating said steps acquiring, estimating, migrating, accumulating and reconstructing for each of said one or more bins for each of said one or more estimation windows.

4. The method according to claim 3, wherein said reflected seismic waves includes at least one or more of primary reflected seismic waves, internal multiples seismic waves, and shallow water-related multiples seismic waves.

5. The method according to claim 1, wherein said 3D seafloor reflectivity image is reconstructed without primary reflections.

6. The method according to claim 1, wherein said 3D seafloor reflectivity image includes data that comprises a bandwidth that is same as the bandwidth of generated seismic data.

7. The method according to claim 1, further comprising:
performing at least one of additional signal processing and data processing on said surface multiples free seismic data for a geographical area of interest (GAI); and
displaying said further processed seismic data.

8. A method for oil and gas exploration in an underground formation covered by shallow water, the method comprising:
acquiring seismic data related to the underground formation by deploying data acquisition equipment, generating seismic waves and detecting reflected seismic waves;
estimating a plurality of 1D prediction deconvolution operators with a group of short offset traces extracted from said seismic data;
migrating each of said plurality of estimated 1D prediction deconvolution operators to create a set of migrated 1D prediction deconvolution operators;
accumulating said set of migrated 1D prediction deconvolution operators to create a set of 3D prediction deconvolution operators;
reconstructing a 3D seafloor set of reflectivities within a geographical area of interest, GAI, using said set of 3D prediction deconvolution operators;
evaluating a seismic wave equation using as an input said reconstructed 3D seafloor set of reflectivities to determine surface multiples;
performing adaptive subtraction of said determined surface multiples in regard to acquired seismic data to obtain surface multiples free seismic data for said GAI; and
generating an image of the underground formation based on the surface multiples free seismic data, the image enabling to evaluate whether oil and gas is present.

9. A seismic data processing system for oil and gas exploration relative to underground formation covered by shallow water, the system comprising:
an interface connected to receivers, configured and deployed to acquire seismic data;
at least one processor connected to the interface and configured
to reconstruct a 3D seafloor reflectivity image using the seismic data,
to evaluate a seismic wave equation using, as an input, said reconstructed seafloor reflectivity image to determine surface multiples,
to subtract said determined surface multiples from the seismic data to obtain surface multiples free seismic data, and
to generate an image of the underground formation based on the surface multiples free seismic data enabling to evaluate whether oil and gas is present,
wherein said at least one processor reconstructs the seafloor reflectivity image by:
estimating a plurality of 1D prediction deconvolution operators with a group of short offset traces;
migrating each of said plurality of estimated 1D prediction deconvolution operators to create a set of migrated 1D prediction deconvolution operators;
accumulating said set of migrated 1D prediction deconvolution operators to create a set of 3D prediction deconvolution operators; and
reconstructing said 3D seafloor reflectivity image within a geographical area of interest, GAI, using said set of 3D prediction deconvolution operators.

10. The system according to claim 9, wherein said group of short offset traces have a length within a range of 200-1000 meters.

11. The system according to claim 9, wherein said at least one processor reconstructs the seafloor reflectivity image by:
causing a seismic source to generate seismic waves, and seismic receivers to acquire the seismic data regarding seismic waves reflected inside said underground formation and related to said generated seismic waves;
storing said seismic data;
creating one or more estimation windows from said stored seismic data;
creating one or more bins for each said one or more estimation windows; and
repeating said steps estimating, migrating, accumulating and reconstructing for each of said one or more bins for each of said one or more estimation windows, and wherein each of said steps of generating, acquiring and storing are performed on a bin-by-bin basis.

12. The system according to claim 11, wherein said reflected seismic waves includes at least one or more of primary reflected seismic waves, internal multiples seismic waves, and shallow water-related multiples seismic waves.

13. The system according to claim 11, wherein the at least one processor is further configured to:
- create one or more estimation windows from said seismic data;
- create one or more bins for each said one or more estimation windows; and
- repeat the estimation, migration, accumulation and reconstruction for each of said one or more bins for each of said one or more estimation windows.

* * * * *